Patented Mar. 16, 1954

2,672,421

UNITED STATES PATENT OFFICE 2,672,421

METHOD FOR PRODUCING CLAM CHOWDER

George H. Christiansen, Newark, N. J.

No Drawing. Application October 22, 1952
Serial No. 316,311

2 Claims. (Cl. 99—124)

This invention relates to a process for preparing clam chowder having accentuated taste and other valuable characteristics.

In the preparation of clam chowder by the conventional procedure, a base is first prepared by cooking vegetables, pork, seasoning, and other ingredients, except the clams. Thereafter, the clams are added to the hot base and cooked for a short time and served. In restaurants and other outlets where large quantities of the chowder are consumed, the chowder, after it is made, is often stored in a cool place and is reheated prior to serving.

It has been found that the addition of the clams to the hot base tends to reduce or inhibit the full taste which is potentially available in the base stock. Also, it has been found that when clam chowder containing clams is stored, even in the cold, it has a marked tendency to become sour, and the clams become quite tough.

According to the present invention, it has been found that a much more palatable chowder is obtained when the base is first aged at a temperature of below 40° F. The plup of the vegetables and other ingredients contains various taste accentuating compounds having limited solubility and slow diffusivity through the pulp cell tissues. Accordingly, if the base, after cooking, is cooled as soon as possible to a temperature below about 40° F., and maintained at that temperature for at least 2-4 hours, delicate flavor ingredients are transmitted into the liquid portion of the base, giving a tastier product, since the taste is mostly due to the liquid portion, rather than the pulp.

It has been further discovered that clams contain certain enzymes and other compounds which either inhibit certain taste ingredients in the base, or react chemically with them to produce inert or less tasteful reaction products.

Hence, according to this invention, the clams are not added to the base during the ageing period at low temperature. After the ageing period, which may take as long as 6-10 hours, the base is reheated, preferably to a simmer temperature of about 200° F., and thereafter the clams are added, and the chowder is cooked for a short time, around 5 minutes.

As a suitable base for a chowder of the present invention, the following recipe may be used.

¼ lb. salt pork, diced
1 large onion, diced
1 cup diced, raw carrots
1 cup diced, raw potatoes
1 cup diced, raw celery
1 No. 2½ can tomatoes (3 cups)
3 cups water
2 teaspoons salt
¼ teaspoon pepper The pork is cooked in a large kettle until it is delicately brown. Then, the onion is added and cooked until brown. Finally, the remaining vegetables, water and seasonings are added, the kettle is covered, and the ingredients are cooked over a simmer heat for about one hour.

After this operation, the base so prepared is cooled, preferably as rapidly as possible, to a temperature of below about 40° F., and held at that temperature for at least 2-4 hours. The base thus aged, or an aliquot portion thereof, is then heated to a simmer temperature of about 200° F., and held there preferably for a few minutes. Finally, the clams (amount depending on taste preference) are added to the heated base and the chowder is cooked for about 5 minutes and served.

In some recipes, clam liquor also is added to the chowder. According to the present invention, neither the clams nor the clam liquor are added to the base until the latter is aged at low temperature as specified.

Some clam chowder recipes also include green peppers, Worcestershire sauce, and similar ingredients.

When prepared in accordance with the process of the present invention the clam chowder possesses a taste far superior to that obtained from conventional clam chowder, due mostly in retaining the more delicate and less soluble taste compounds which normally would have been destroyed or inhibited.

I claim:

1. A method for producing a clam chowder comprising the steps of cooking a base containing vegetables, pork, seasoning, and water, cooling said base to a temperature of below about 40° F., ageing said base at said temperature for at least 2 to 4 hours, reheating said base, adding clams to said reheated base, and cooking for a short period.

2. The method according to claim 1 in which the reheating is done at a simmering temperature of about 200° F.

GEORGE H. CHRISTIANSEN.

References Cited in the file of this patent

"The Boston Cooking School Cook Book," by Fannie Farmer, 7th Ed., Garden City Publishing Co., Inc., Garden City, N. Y., 1945, pages 208 and 209.

"Everybody's Cookbook" by Lord, Revised Edition, Harcourt, Brace and Company, N. Y., pages 716 and 717.